United States Patent [19]

Ting et al.

[11] Patent Number: 5,523,489
[45] Date of Patent: Jun. 4, 1996

[54] PREPARATION OF TETRAHYDROISOHUMULONES

[75] Inventors: Patrick L. Ting; Henry Goldstein, both of Brookfield, Wis.

[73] Assignee: Miller Brewing Company, Milwaukee, Wis.

[21] Appl. No.: 384,900

[22] Filed: Feb. 7, 1995

[51] Int. Cl.[6] .................................................. C07C 45/62
[52] U.S. Cl. ............................................ 568/347; 568/350
[58] Field of Search ..................................... 568/347, 350

[56] References Cited

U.S. PATENT DOCUMENTS

| | | | |
|---|---|---|---|
| 3,552,975 | 1/1971 | Worden et al. | 99/50.5 |
| 3,923,897 | 12/1975 | Worden | 260/586 D |
| 4,644,084 | 2/1987 | Cowles et al. | 568/341 |
| 5,013,571 | 5/1991 | Hay | 426/600 |
| 5,296,637 | 3/1994 | Stegink et al. | 568/341 |

*Primary Examiner*—James H. Reamer
*Attorney, Agent, or Firm*—Quarles & Brady

[57] ABSTRACT

Tetrahydroisohumulones are prepared from isohumulones by hydrogenating the isohumulones in a reaction solvent of ethanol containing up to about 15% water in the presence of about 1 to about 40 psig of hydrogen and a hydrogenation catalyst to form tetrahydroisohumulones.

1 Claim, No Drawings

PREPARATION OF TETRAHYDROISOHUMULONES

FIELD OF THE INVENTION

The present invention relates to bittering agents for flavoring beer and other beverages. More particularly, it relates to a method of preparing tetrahydroisohumulones which are known bittering agents.

DESCRIPTION OF THE PRIOR ART

Tetrahydroisohumulones are light-stable FDA-approved bittering agents which can be used to add a hop flavor to beer. They usually are prepared from the beta-acids (or lupulones) in hop extracts. The hop extracts also contain alpha-acids (or humulones) but they are not normally used to make tetrahydroisohumulones.

In the Worden et al. U.S. Pat. No. 3,552,975 a method is disclosed employing organic solvents and lead salts to make tetrahydroisohumulones from beta-acids. The final product is a crude mixture from which the residues of lead can only be removed with great difficulty. The presence of residual lead in products to be consumed is obviously undesirable.

In the Worden U.S. Pat. No. 3,923,897 a process for preparing tetrahydroisohumulones from beta-acids is disclosed which involves the oxidation of desoxytetrahydrohumulones with a peracid followed by isomerization of the resulting tetrahydrohumulones. The process does not utilize lead salts but it is conducted in water immiscible organic solvents and it involves cumbersome solvent changes which increase process cost. The presence of even residual amounts of such solvents in food products, such as beverages, is undesirable.

In the Cowles et al. U.S. Pat. No. 4,644,084 a process is disclosed for making tetrahydroisohumulones by treating beta-acids to form desoxytetrahydrohumulones which are dissolved in an aqueous alcoholic caustic solution and then oxidized with an oxygen-containing gas in the presence of metallic ions to form the desired tetrahydroisohumulones. The process of Cowles et al. patent does not use undesirable organic solvents and is superior to other known processes using beta-acids.

In the Hay U.S. Pat. No. 5,013,571 a process is disclosed for simultaneously isomerizing and reducing alpha acids to tetrahydroisohumulones (THIAA). The Hays patent process uses relatively high pHs (8 to 10), significant amounts of water and hydrogen pressures above about 50 psig. As a result, side reactions can take place that can result in undesired products. Furthermore, the desired tetrahydroisohumulones are not easily isolated from the Hay reaction mixture.

It obviously would be desirable to have a simple method of making tetrahydroisohumulones from isohumulones which did not result in the formation of undesired products and in which it is easy to isolate the tetrahydroisohumulones from the reaction mixture.

SUMMARY OF THE INVENTION

It is an object of the present invention to disclose a simple method of preparing tetrahydroisohumulones from isohumulones that does not result in the formation of undesirable products.

It is a further object to disclose a method of preparing tetrahydroisohumulones from isohumulones in which the desired tetrahydroisohumulones can be easily isolated in pure form.

In the inventive method, substantially pure isohumulones are dissolved in ethanol containing about 3% to about 15% water (w/w) having a pH of about 1 to about 7 and hydrogenated in the presence of a suitable hydrogenation catalyst at pressures of from about 1 to about 40 psig within 2 hours to form the pure tetrahydroisohumulones in the ethanol and water from which the tetrahydroisohumulones can be readily isolated, if desired.

The tetrahydroisohumulones obtained by the practice of the inventive method require no further purification and have the same desirable properties as commercially available tetrahydroisohumulones.

DESCRIPTION OF THE PREFERRED EMBODIMENT

In the preferred practice of the present invention, the isohumulones are prepared from a purified alpha-acid preparation by a process which comprises dissolving a whole $CO_2$ hop extract, containing the alpha-acids, beta-acids and hop oil, in aqueous alkaline (two volumes of $H_2O$ and one equivalent of KOH or NaOH having a pH of about 6 to about 8.7) with stirring at about 50° to about 60° C.; separating the aqueous phase, which contains substantially pure alpha-acids, from an oily phase, which contains beta-acids and hop oil; adding to the aqueous phase, a catalytic amount of a divalent magnesium salt, such as magnesium sulfate; stirring and heating the mixture under reflux for about 30 to about 90 minutes to isomerize the alpha-acids; cooling the mixture to about 85° C. and adding 50% w/w sulfuric acid with stirring; and when the temperature cools to about 70° C. isolating substantially pure isohumulones from the top layer of the two layers which form.

In the preferred method of the invention, the isohumulones are dissolved in ethanol containing about 10% w/w water, pH of about 1 to about 7, and hydrogenated with hydrogen in the presence of a 5% palladium on carbon (Pd/C) hydrogenation catalyst at a pressure of about 20 psig and a starting temperature of about 25° C. to form the desired tetrahydroisohumulones. The reaction proceeds to completion within about 1 hour.

In addition to low temprature and pressure, the presence of acidic water during hydrogenation is important because isohumulones are subject to reduction of the carbonyl group at carbon 6 as well as the desired reduction of the carbon-carbon double bonds. The former reduction is undesirable because it produces neotetrahydroisohumulones which are not as bitter as tetrahydroisohumulones.

However, insufficient hydrogenation reaction time can result in dihydroisohumulones (intermediates) which are light unstable in beer. Therefore, the catalytic activity (water content) of Pd/C plays an important role in control of incomplete or over-reduced hydrogenation. Sufficient reaction time is required to eliminate the dihydroisohumulones (incomplete light unstable products). If reaction conditions are not precisely set, reduction to neo-tetrahydroisohumulones and loss of bitterness occurs. Addition of water to the solution decreases the catalytic activity with respect to reduction which results in less over-reduced products (neo-tetrahydroisohumulones).

The presence of large amounts of water is undesirable because it makes it more difficult to isolate the tetrahydroisohumulones from the reaction mixture.

The method of the present invention may be illustrated as follows:

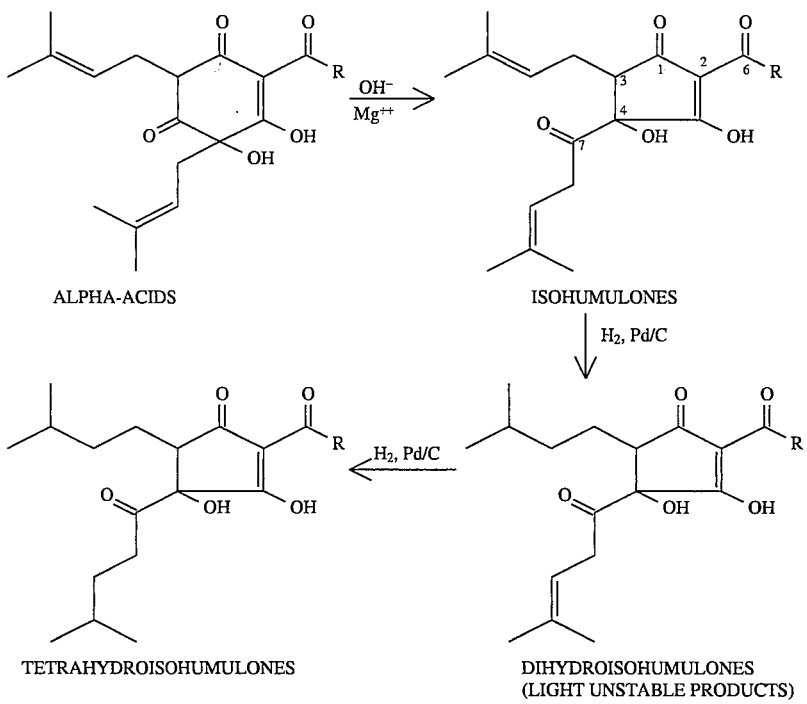

In which R is —CH(CH$_3$)$_2$; —CH$_2$CH(CH$_3$)$_2$; or —CHCH$_2$CH$_2$CH$_3$.

The practice of the invention is further illustrated by the following examples:

EXAMPLE 1

Preparation of a Pre-purified Alpha-Acid Solution

A whole CO$_2$ hop extract is stirred at 50°–60° C. with two volumes of water and one equivalent of potassium hydroxide or sodium hydroxide per equivalent of alpha-acids for 10–15 minutes. Two layers form and after gravity separation, the aqueous phase is cooled and filtered to remove trace amounts of beta-acids. The aqueous phase usually consists of about 16% alpha-acids and no beta-acids when assayed by UV.

EXAMPLE 2

Isomerization of the Alpha-Acids

A 2-liter sample of a pre-purified alpha-acid solution prepared as described in Example 1 is added to 20 g of magnesium sulfate with stirring, and brought to reflux for 30–90 minutes.

The solution is cooled to 85° C., and 250 mL of 50% w/w H$_2$SO$_4$ is added with stirring to adjust the pH to about 1 to 2. When the temperature drops to 70° C., the layers are allowed to separate; the top layer contains 259 g of ≧90% pure isohumulones as determined by UV and HPLC analysis. Trace amounts of humulinic acids may be found, but no alpha-acids are detected.

EXAMPLE 3

Hydrogenation of Isohumulones

To a solution of 50 g of isohumulones (prepared by the method of Example 2) in 200 mL of ethanol is added 30 mL of water (15% w/w; pH 1 to about 7) and 10.6 g of 5% Pd/C (5 g dry basis, Degussa E-198 R/W catalyst).

The mixture is placed in a pressure autoclave, and the vessel is purged with (3×50 psig) nitrogen. The vessel is then purged with hydrogen, and the pressure is maintained at 20 psig, with stirring (1200 rpm). The temperature rises from 25° C. initially to a maximum of 42.5° C. after 13–15 minutes. The reaction is continued for 15–20 minutes after the maximum temperature is achieved. The reaction is complete after about 1 hour.

The catalyst is removed by suction filtration and washed with 5.0–60 mL of ethanol. Removal of the ethanol and water solvent by rotary evaporation affords 58 g of pure tetrahydroisohumulones.

EXAMPLE 4

Formulation of Tetrahydroisohumulones

To 58 g of tetrahydroisohumulones is added 350 mL of water and it is heated to 50°–60° C. with agitation. Then 17.0 g of 45% KOH added and stirring is continued for 15–30 minutes. The mixture is allowed to stand until it cools to room temperature. The supernate solution is separated by decantation. The resultant solution contains 5–10% w/w tetrahydroisohumulones which can be added to beer.

The foregoing examples have been for purpose of illustration and a number of changes can be made without departing from the spirit and scope of the present invention.

The method described herein for making pure isohumulones from alpha-acids is preferred because the other hop components (alpha-acids, beta-acids, and hop oils) if present might be hydrogenated to various, unacceptable products which would detract from the usefulness and value of the tetrahydroisohumulones.

In the hydrogenation, in place of the preferred 5% palladium on carbon catalyst, other catalysts may be used containing from about 1% by weight to about 10% palladium on carbon. The use of more catalyst has little effect other than a shorter reaction time. Other catalysts also might be used, such as palladium on alumina and platinum catalysts, provided they will convert all the isohumulones and dihydroisohumulones (intermediates) to the desired tetrahydroisohumulones under the conditions of use without the production of undesirable by-products or intermediates.

The pressure of the hydrogen gas employed during the hydrogenation may be different than the 20 psig used in the Example 3. Preferably, pressures between one atmosphere and about 40 psig are used. However, slight increases in the overall reaction time may be noted if lower pressures are used. The reaction time should be sufficiently long to convert all the isohumulones and intermediates to tetrahydroisohumulones because any residual starting material or intermediates could render the final products (beers) unstable to light. The reaction will usually be complete in 30 minutes to 1 hour or less even when low pressure conditions are employed. The use of pressures higher than 40 psig increases the likelihood of side reactions occurring which can result in the formation of undesired products.

It will be apparent to those skilled in the art that the method of the present invention for converting isohumulones to tetrahydroisohumulones avoids the use of objectionable organic solvents and other toxic reagents. The method also employs low pHs and low pressures. Therefore, the likelihood that undesired products will form is reduced. Furthermore, because the tetrahydroisohumulones are obtained in a mixture of ethanol with a relatively small amount of water, the isolation of the tetrahydroisohumulones is facilitated.

It is intended that the invention not be limited by the foregoing description, but only by the claims which follow:

We claim:

1. A method of preparing tetrahydroisohumulones from isohumulones which consists of dissolving the isohumulones in an ethanol solution containing about 3% to about 15% water by weight and having a pH of about 1 to about 7; reducing the isohumulones in the solution in the presence of up to about 20 psig of hydrogen and a palladium on carbon hydrogenation catalyst to form tetrahydroisohumulones and isolating the tetrahydroisohumulones in pure form by removing the ethanol and water by evaporation.

* * * * *